US011987860B2

(12) United States Patent
da Silva

(10) Patent No.: US 11,987,860 B2
(45) Date of Patent: May 21, 2024

(54) LOW TEMPERATURE BRIQUETTE OF FINES BEARING IRON AND OTHER METALS

(71) Applicant: Sidney Nicodemos da Silva, Belo Horizonte (BR)

(72) Inventor: Sidney Nicodemos da Silva, Belo Horizonte (BR)

( * ) Notice: Subject to any disclaimer, the term of this patent is extended or adjusted under 35 U.S.C. 154(b) by 0 days.

(21) Appl. No.: 17/986,615

(22) Filed: Nov. 14, 2022

(65) Prior Publication Data

US 2023/0167524 A1 Jun. 1, 2023

Related U.S. Application Data

(60) Provisional application No. 63/244,916, filed on Sep. 16, 2021.

(51) Int. Cl.
*C22B 1/243* (2006.01)
*B22F 1/105* (2022.01)
(Continued)

(52) U.S. Cl.
CPC .............. *C22B 1/243* (2013.01); *B22F 1/105* (2022.01); *B22F 3/18* (2013.01); *C22B 1/244* (2013.01)

(58) Field of Classification Search
CPC ......... C22B 1/243; C22B 1/24; C22B 1/2406; C22B 1/242; B22F 1/105; B22F 3/18
See application file for complete search history.

(56) References Cited

U.S. PATENT DOCUMENTS

| 5,100,464 A * | 3/1992 | Kelly | ...................... C22B 1/242 |
| | | | 75/321 |
| 6,921,427 B2 | 7/2005 | Nayak et al. | |

(Continued)

FOREIGN PATENT DOCUMENTS

| BR | 102016025630 A2 | 5/2018 |
| BR | 102017023459 | 6/2019 |

(Continued)

OTHER PUBLICATIONS

Chen et al. ("Development and mechanism analysis of a highly efficient binder in pelletizing of ilmenite used in electric furnace." Journal of Iron and Steel Research International 25 (2018): 1232-1236. (Year: 2018).*

(Continued)

*Primary Examiner* — Sally A Merkling
*Assistant Examiner* — Ricardo D Morales
(74) *Attorney, Agent, or Firm* — Finch & Maloney PLLC

(57) ABSTRACT

A method for processing fines bearing iron or other metals, such as manganese, bauxite, boron, chromium, iron-nickel and/or ferrous slags, from various possible sources, possibly with the addition of self-reducing agents and other minerals for chemical adjustment, with particle size up to 6.3 mm (through ¼ inch sieve), directly into the intense mixer, with a set of binders in specific proportions, aiming to optimize physical and metallurgical properties of the briquettes with minimal binder addition, thus not compromising the quality of steel or other metal products. The binders are starch, sodium silicate and a base such as sodium hydroxide. The mixture with adjusted moisture content goes through a conventional briquetting roller press. The green briquettes then undergo drying with forced air at around 150° C. for a short time, or at ambient temperature for a longer time. The briquettes obtained have excellent metallurgical properties, (Continued)

and sufficient physical resistance for handling and transport, without the high and undesirable economic and environmental costs of the hot briquetting process.

14 Claims, 2 Drawing Sheets

(51) Int. Cl.
*B22F 3/18* (2006.01)
*C22B 1/244* (2006.01)

(56) References Cited

U.S. PATENT DOCUMENTS

| | | |
|---|---|---|
| 7,896,963 B2 | 3/2011 | Liu |
| 8,999,032 B2 | 4/2015 | Dutra et al. |
| 9,175,364 B2 | 11/2015 | Porto Pimenta et al. |
| 10,815,548 B2 | 10/2020 | Ramirez Alvarez et al. |
| 2014/0020511 A1 | 1/2014 | Pimenta et al. |

FOREIGN PATENT DOCUMENTS

| | | |
|---|---|---|
| BR | 102019009592 B1 | 7/2020 |
| CN | 101586184 A | 11/2009 |
| CN | 104651605 A | 5/2015 |
| WO | 2004050924 A1 | 6/2004 |
| WO | 2012/112585 A2 | 8/2012 |
| WO | 2019/033187 A1 | 2/2019 |
| WO | 2020/122701 A1 | 6/2020 |
| WO | 2021/087582 A1 | 5/2021 |

OTHER PUBLICATIONS

Forouzan et al. ("Tortuosity of composite porous electrodes with various conductive additives in an alkaline system." Journal of the Electrochemical Society 164.13 (2017): A3117.). (Year: 2017).*

* cited by examiner

LOW TEMPERATURE BRIQUETTE OF FINES BEARING IRON AND OTHER METALS

TECHNICAL FIELD

This invention generally relates to the agglomeration process of iron bearing fines into briquettes for iron and steel making, specifically to the binders used and the consequent benefits.

BACKGROUND

The iron ore produced in mines worldwide is classified according to particle size in granulate (particle size mostly above 6.3 mm), sinter feed (particle size mostly between 0.15 mm and 6.3 mm) and pellet feed (particle size mostly below 0.15 mm). The pellet feed is usually produced after concentration of low content iron ore.

It is important to note that, in addition to these products, tailings are also produced, which are usually deposited in dams. Tailings dams have recently become one of the main topics in the discussion of more sustainable processes in iron ore mining, with a focus on reducing the amount of tailings deposited and creating smart solutions so that tailings can be reused. Often, the tailings that are deposited in the dams have a significant concentration of iron, however, due to their nature—very fine particles and high moisture content their utilization is difficult.

SUMMARY

In accordance with one embodiment, a lower temperature briquetting process of iron bearing fines consists of adding a mix of binders to said fines, and drying the resulting green briquettes in temperatures lower than in the conventional curing or indurating process, to reach enough physical resistance for bulk handling and transportation, and to be fed into furnaces or reactors for reduction of iron oxide into metallic iron.

DETAILED DESCRIPTION

Blast furnaces are the most used route to reduce iron oxide into metallic iron, and they operate with a metallic charge containing granulated iron ore (also known as lump), pellets, sinter and, in some cases, briquettes, plus coke or charcoal as fuel, in addition to fluxes (e.g. limestone, dolomite or quartz), varying according to the operating parameters of the blast furnace or the metallurgical properties of the raw material—in some cases the fluxes may be replaced by metallic fillers agglomerated with self-melting materials (briquettes or pellets). Raw materials descend inside the blast furnace in countercurrent with CO (carbon monoxide) from the combustion of fuels (carbon) with an oxidizer (heated oxygen blown by the vents). Besides pig iron or hot metal and slag, the interaction and reactions between gases and raw materials inside the blast furnaces also produce ferrous dust and slurry that, together with ferrous by-products generated in other processes in steel making, e.g. converter dust, electric arc furnace dust and converter sludge, are difficult to use due to the small particle size. If there is a sintering plant nearby, these fines may be added to the sinter feed, even though this practice reduces the permeability of the ore to be sintered, affecting the operational performance of the process.

Iron bearing fines are generated both in iron ore mining and steel making, and agglomeration of these fines is a critical issue for an efficient and sustainable industry.

The pelletizing process is widely used, and it converts pellet feed—iron ore fines with particles below 0.15 mm—into pellets of 8 to 16 mm diameter.

The sintering process is used in almost all integrated steel plants. It processes sinter feed, iron ore fines with particle size between 0.15 mm and 6.3 mm, burning it with solid fuel, fluxes and iron bearing fines generated in the steel making, even though this practice reduces the permeability of the ore bed, affecting the operational performance of the process. The resulting sinter is a multiform, open-grained and consistent iron ore agglomerate.

Both pelletizing and sintering processes require large industrial installations, and demand the fines to be heated to 1,300° C. or more, with high consumption of fossil fuels, and high emissions of greenhouse gases (GHG). The iron and steel industry in general is faced with the challenge of processing fines, tailings, dust and sludges generated throughout the industrial process steps.

Figure 1:
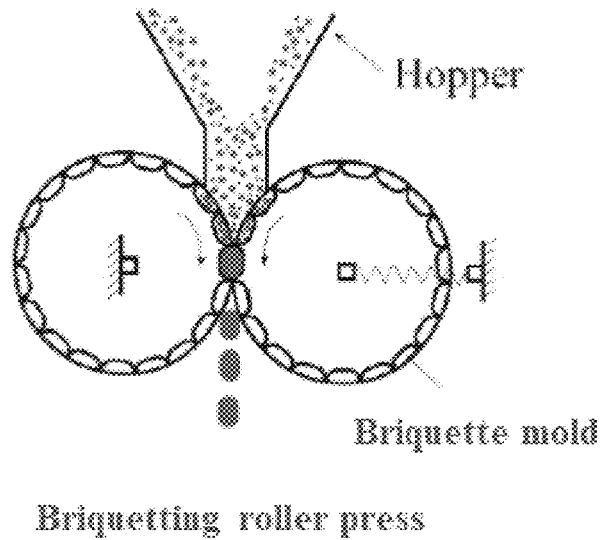
FIG. 1 shows the briquetting operation.

Briquetting is a basic method of agglomerating fines—and often the only practicable method. It consists of the agglomeration of fine particles by means of compression, as shown in FIG. 1, obtaining a compacted product, with adequate shape, size and mechanical parameters. The mixture between fine particles and agglomerate is cold or hot pressed, in order to obtain agglomerates called briquettes, which must have adequate resistance for stacking, further treatment (for example, drying and curing), transport, handling and use in metallurgical reactors. Briquettes are of uniform size, shape, weight and composition.

Briquetting has been used to agglomerate coal fines for more than a century, but it never became largely used for metal bearing fines mainly due to its cost and the generally smaller scale of its equipment.

The agglomeration of particles by briquetting occurs through the application of pressure, usually with the aid of a binder and some moisture, which allows particles within a wide particle size range, including very fine particles, to have greater adhesion together and produce briquettes resistant enough for handling, transportation and later applications.

Figure 2:
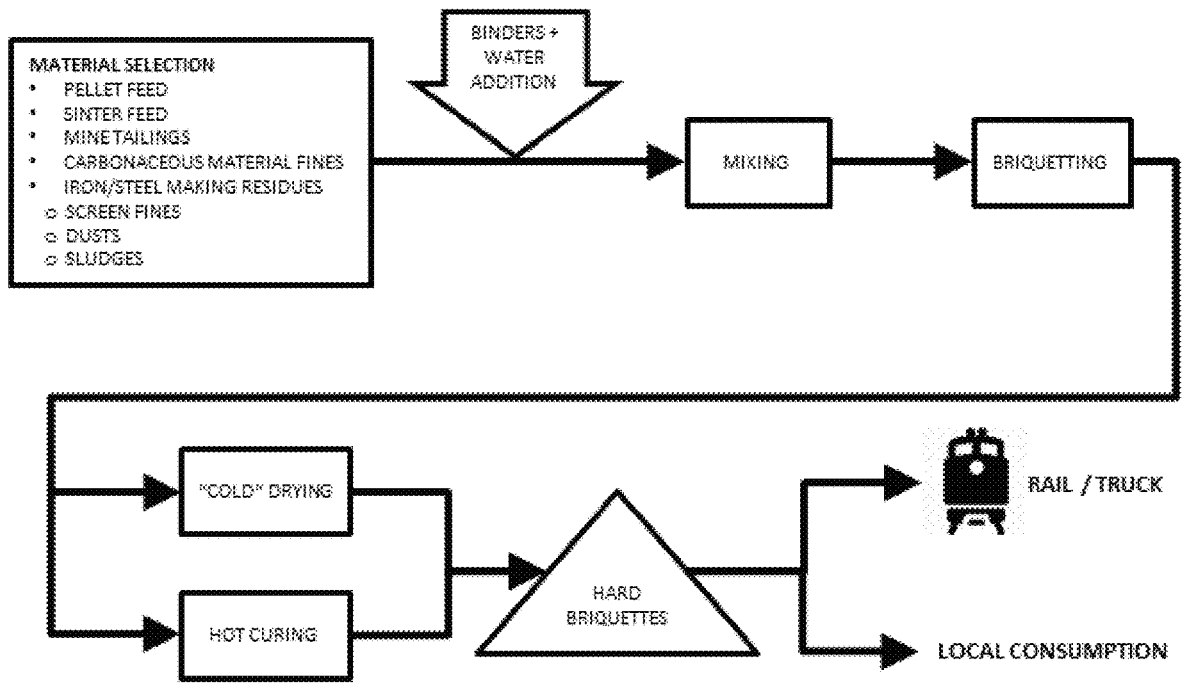
FIG. 2 shows a simplified flowchart of the briquetting process with its alternatives.

Different from the very standardized pelletizing and sintering processes, briquetting may be implemented in different ways, according to the application, as illustrated in FIG. 2. It may agglomerate a wide variety of fines from several sources and with different particle sizes and iron content levels—or even mixed with a self-reducing agent such as coke or coal. It may require heating for cure and drying or not.

For some materials as, for example, coal fines, briquetting may be done without any binder addition. However, for fines bearing iron or other metals, binders are required, and binders lead to a need for drying/curing, which consists of reactions that occur between the particles and the binder which will give the agglomerate the desired mechanical strength. Cold curing briquettes, that is, those curing at room temperature have a lower cost when compared to hot briquetting, which requires the briquettes to be heated to gain strength.

As the steel industry and metallurgy in general are heavy users of electricity and fossil fuel, environmental awareness has sparked many attempts to find a way of briquetting fines bearing iron and other metals at ambient or low temperature, to avoid the necessity of heating to higher temperatures. To date no such process has proved satisfactory in terms of scale and cost effectiveness. The general requirements for good quality agglomerates include sufficient strength for handling and for long distance transportation, the ability to withstand outside storage without substantial detrimental effects and complete reducibility in iron and steel furnaces without premature degradation or excessive swelling.

Numerous so-called cold or low temperature briquetting processes have been developed in which inorganic binders such as clinker, cement, bentonite or sodium silicate, or organic binders such as tar, asphalt, molasses, and polymers have been employed. In general the resulting briquettes have been either too expensive to produce, are inadequate for scale production, worsen the chemical composition, worsen metallurgical performance and/or have been deficient in strength, impact resistance or abrasion resistance.

EXAMPLE EMBODIMENTS

Figure 3:
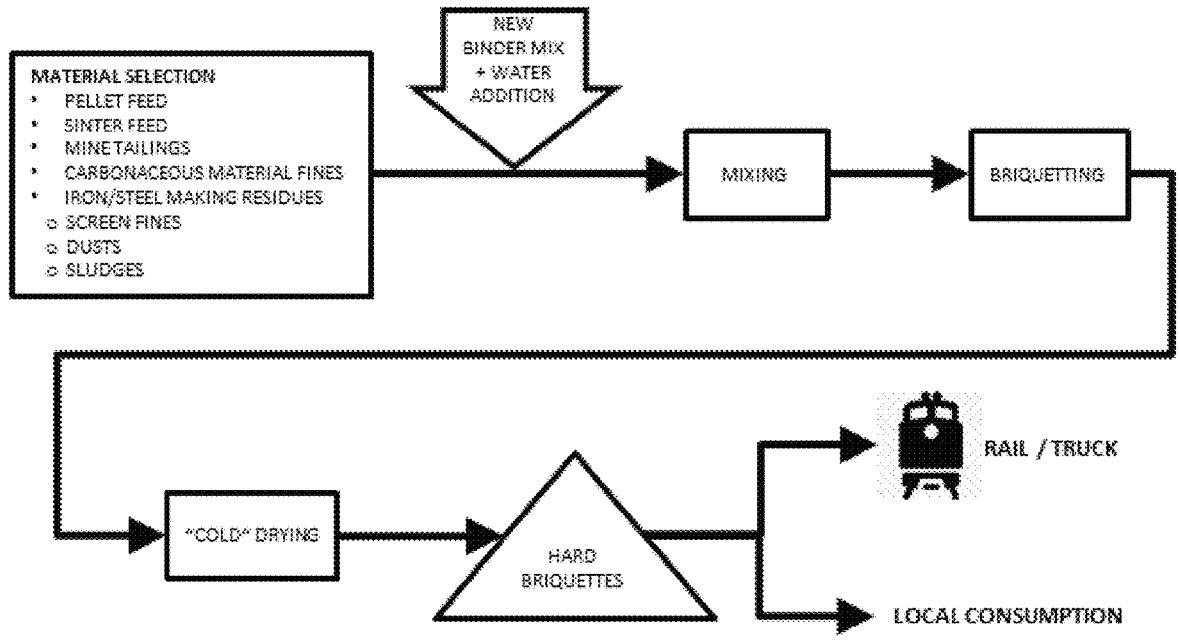
FIG. 3 shows a simplified flowchart of the proposed briquetting process of iron bearing fines.
Figure 4:
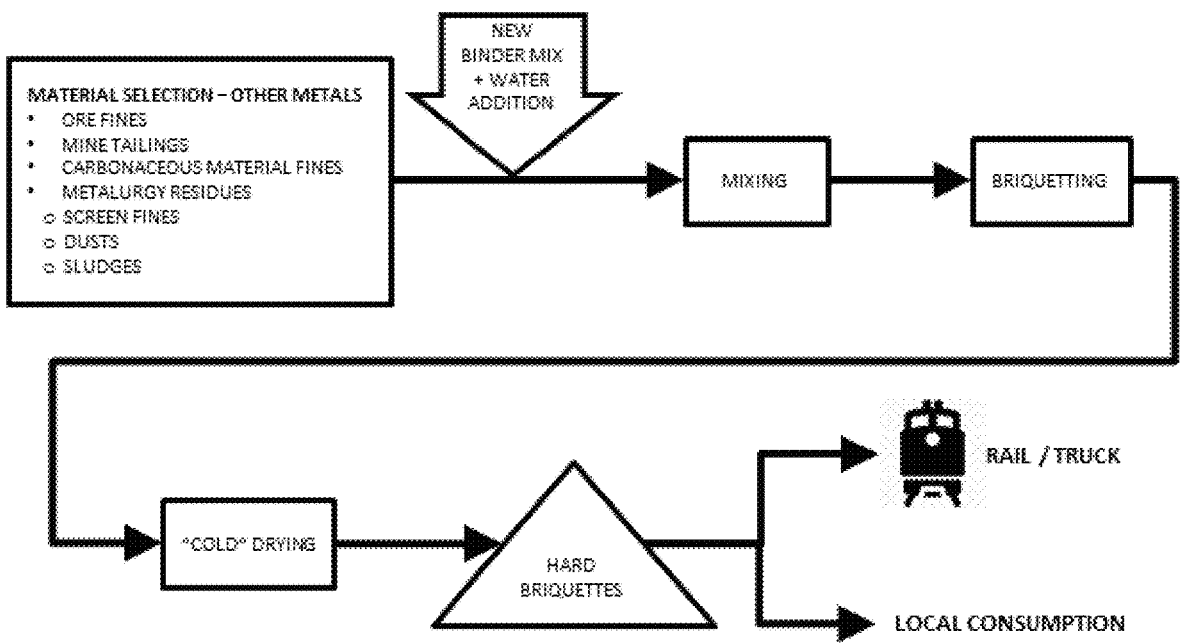
FIG. 4 shows a simplified flowchart of the proposed briquetting process of fines bearing other metals.

In one aspect, an embodiment of a low temperature briquetting process is illustrated in FIG. 3, for iron bearing fines, and in FIG. 4, for fines bearing other metals, such as manganese, bauxite, boron, chromium, iron-nickel and/or ferrous slags.

For iron bearing fines, the process makes possible the use of different types of fines. These fines can be regular pellet feed, sinter feed, fines generated from mining processing or even from industrial residues of blast furnaces or steel mills. Likewise, for fines bearing other metals, such as manganese, bauxite, boron, chromium, iron-nickel and/or ferrous slags, the fines can be ore fines generated from mining processing or even from industrial residues of furnaces or reactors.

One important benefit of this innovative agglomeration process is the possibility to produce hard briquettes from mine tailings and fines otherwise rejected. It also accommodates the use of poor ore fines within a wide range of chemical composition and still attends furnaces requirements.

The raw material used is particulate from fines bearing iron or other metals smaller than 6.3 mm (through ¼ inch sieve) with all the particle size distribution in this range, optimizing the briquette properties and reducing the quantity of additives needed for their agglomeration.

The storage of selected raw material is linked directly to the mixing, prior to the briquetting operation, with dosing devices to ensure the chosen proportion.

The New Binder combination addition consists of one or two silos equipped with weight dosing devices and two tanks with dosing pumps, and all their output joins the iron ore fines into the mixer. Conveyor belts, for solid particulates, link the binder component storage bins to the mixer. The tanks with solutions may be linked through pipelines to the mixer or alternatively can be sprayed directly at the balling discs or drums. An alternative layout is to have one tank with a combined mixture in the right proportion of two or more of the binders, and from there, be linked through dosing devices and pipelines to the mixer or balling equipment.

The binders are described below:

Starch solid particulate, native or unmodified starch, pregelatinized or not, preferably from manioc, corn or beetroot Sodium hydroxide solution, typically found at around 50% w/w concentration.

Sodium silicate solution, preferably with $SiO/Na_2O$ molar ratio in the 2.05-2.50 range, typically found in 40% to 50% w/w concentration range Graphene solid particulate, graphene-based nanoplates <50 layers of graphene (source: graphenic material obtained from graphite by the chemical exfoliation method)

The mixer consists of intensive mixers to receive the fines and all the binder components needed to ensure the proper homogenization of the mixture. The mixers may be, for example, paddle mixers.

The mixture of raw material and binders in appropriate proportion is fed to the hopper that conducts material to the briquetting roller press. The roller press consists of two briquetting cylinders, as shown in FIG. 1. Each cylinder's surface includes concave built in briquette molds, in a way that, rotating in opposite directions and pressed against each, they compress the mixture forming the briquettes, that go through a screening device that separates the fines for recirculation back to the mixer, and are conveyed to the drying operation.

The low temperature drying operation is performed in a dryer that exposes the green briquettes to forced convection with heated air that may be mixed with other hot gases for thermal efficiency purposes. One alternative for this operation is to use a rotary dryer with counter flow of heated air, pure or mixed with other gases.

The dryer can linked via one or more conveyor belts to a location such as the stockyard, shipping dock, or a plant for consumption of the hard briquettes. The conveyor belts and stockyards for said hard briquettes can be covered to offer protection against the rain.

The fines bearing iron or other metals to be agglomerated may be a mix of any type of fines generated in the several stages of the iron and steel industry or metallurgy in general, as long as the vast majority of particles have particle size less than 6.3 mm. According to the chemical composition of the fines and the requirements for the briquettes, it may be necessary to add small amounts of minerals, for example, limestone or dolomite, in order to achieve the required chemical composition, especially the MgO and CaO content. In the case of producing self-reducing briquettes, fines from carbonaceous material such as coal or coke are also added. These additions to the metal bearing fines may be done in the raw material pile in the stockyard, or in the mixer, the same way the binders are added.

In various embodiments, the amount of binder components can differ. All values are based on dry briquette mass and are w/w. The starch content can be less than 3%, less than 2.5%, less than 2%, less than 1.5%, less than 1% or less than 0.6%. In other embodiments, the starch content can be greater than 0.1%, greater than 0.2% or greater than 0.3%. The sodium hydroxide (50%) content can be less than 3%, less than 2.5%, less than 2%, less than 1.5%, less than 1%, less than 0.6%, less than 0.3% or less than 0.2%. In other embodiments, the sodium hydroxide content can be greater than 0.01%, greater than 0.05% or greater than 0.1%. Sodium silicate content can be, for example, less than 3%, less than 2.5%, less than 2%, less than 1.5%, less than 1%, less than 0.6%, less than 0.3% or less than 0.2%. In other embodiments, the sodium silicate content can be greater than 0.01%, greater than 0.05% or greater than 0.1%. Graphene content can be, less than 2%, less than 1.5%, less than 1%, less than 0.6%, less than 0.3%, less than 0.2% or less than 0.1%. In other embodiments, the graphene content can be greater than 0.01%, greater than 0.05%, greater than 0.1% or greater than 0.2%. The binder quantities used in one embodiment of the lower temperature briquetting process are shown in Table 1, with different binder (additives) types and their respective proportion range (% w/w dry briquettes). Water is also added to the mixer with the fines and the binders to ensure the appropriate moisture content for the following operations. Moisture content in the mixture can be, for example, by weight, greater than 1%, greater than 3%, greater than 5% or greater than 7%. In other embodiments, the moisture content can be less than 10%, less than 8% or less than 6%. The components may be added to the mixer individually or pre-mixed in the right proportion in a homogenous solution, suspension or in solid particulate form. In various embodiments, the amount of starch can be greater than 0.1%, greater than 0.5% or greater than 1%, by weight. Graphene content can be, for example, zero, greater than 0.001%, greater than 0.01% or greater than 0.1%, by weight.

TABLE 1

Preferable binder quantity used in the process (% w/w dry).

| BINDER | QUANTITY % |
|---|---|
| Starch | 0.5 to 1.5 |
| Sodium Hydroxide | 0.05 to 0.5 |
| Sodium Silicate | 0.05 to 1.5 |
| Graphene | 0.01 to 0.03 |

The nature and limited quantity of the additives, especially the Sodium Silicate, can result in much lower levels of undesired chemicals for steels and cast iron or other metallurgic products, such as Silica, Alumina, Phosphor, Sulfur and Sodium, to be incorporated in the briquettes, when compared to other attempts of briquetting at low temperatures, thus improving the performance in furnaces and reactors. The homogenized mixture of iron bearing fines and binders with the appropriate moisture content (up to 6%), is then transformed into green briquettes through the briquetting roller press, with the application of 100 to 500 kgf/cm$^2$ (10 to 50 MPa) pressing the cylinders against each other.

The green briquettes are then dried preferably for less than one hour under forced flow of air, pure or mixed with other gases, at a temperature greater than 100° C. and less than 200° C. In one embodiment the gas flow is about 150° C. +/−10° C. The drying process may also be performed at lower temperatures, although requiring longer time. The briquettes reach mechanical resistance satisfactory for bulk handling, belt transportation, piling, reclaiming, dumping in and out rail cars and charging into reactors or blast furnaces.

The hardening mechanism in this embodiment is due to the size distribution of the particles with high reactivity or chemical affinity of the binders, which promotes microstructural consolidation at low temperatures, forming a relatively cohesive and porous matrix. This matrix involves granules, powders and colloids in close contact and, when the moisture is reduced, they form a consolidated glass-ceramic matrix from agglomerates within the briquettes, possibly due to the formation and consolidation of hydration reactions, which chemically bind the particles. The compression of the material in the briquetting roller press reduces the voids between granules and amplifies the effects of the phenomena described above.

The low temperature drying operation of green briquettes alleviates the need for high temperature induration, and the resulting dried briquettes may be piled in the stockyard, loaded directly into wagons for rail transportation or fed into the furnace or reactor. The storage, transportation and handling should be done avoiding direct exposure to the weather.

Thus, since the high temperature induration is replaced by a much simpler drying operation, the present embodiment represents much lower operating and capital costs, besides a reduction in the release of greenhouse gases (GHG) compared to prior-art.

Second Embodiment

A second embodiment is similar to the first one, with the only difference in the drying operation, and can therefore also be represented by the same FIGS. 3 and 4. Instead of drying under forced convection in an oven or other device alike, as in the first embodiment, the green briquettes are transported and deposited in the drying area with minimum handling stress, meaning few and low height drops in transfer points. All conveyor belts, transfer points and the drying area are covered for weather protection. From the drying area, briquettes are then reclaimed and transported by land to consumers, for example, by rail, trucks or conveyor belts.

The operation in this second embodiment is the same as in the first one, with the exception of the drying operation. Instead of drying under forced flow of air at around 150° C., as in the first embodiment, the green briquettes are transported and spread out in a drying area with minimum handling stress, since the green briquettes have not yet acquired high physical resistance at this stage. The briquettes are left to dry at ambient temperature and natural convection in the drying area for one to two days, depending on ambient temperature and humidity, until they reach the physical resistance needed for handling and transportation to consumers by land.

One skilled in the art will see several advantages of the disclosed material and method. The disclosed process provides a method for briquetting fines bearing iron or other metals and avoids or largely reduces the necessity to heat the briquettes at high temperature, while producing briquettes of sufficient mechanical resistance to permit handling, transportation and use in blast furnaces or direct reduction reactors, or in metallurgy processes in general, with lower electrical and thermal energy consumption, lower greenhouse gas (GHG) emissions, among other benefits.

From the description above, a number of advantages of some embodiments of the Low Temperature Briquetting Process become evident:

The possibility to use several raw materials with different particle size, under 6.3 mm, and chemical composition, including materials difficult to process such as residues from metallurgy or iron/steel making and mine tailings;

The hardening happens at lower temperatures, and reaches sufficient resistance for bulk handling and land transportation;

Lower addition of undesired chemicals for siderurgic products, such as Silica, Alumina, Phosphor, Sulfur and Sodium, incorporated in the briquettes, when compared to prior art attempts of briquetting at low temperatures;

Metallurgical properties of the briquettes related to performance at consumers, such as RDI and reducibility, are outstanding, well above the acceptable limits.

Thus the Low Temperature Briquetting Process disclosed herein has a lower operational cost, lower emission of greenhouse gases (GHG), and lower capital expenditure for new plants, compared to the state of the art.

Several aspects of said benefits are listed below:

The proposed process allows the induration operation to be done at temperatures around 150° C. or less, resulting in lower fuel consumption, lower emissions of greenhouse gases (GHG), less deterioration of components, with consequent lower maintenance costs and higher working rate, and possibly increasing the capacity limit of briquetting plants;

The briquetting plants may dry the briquettes at around 150° C. in simple equipment, for example, a counter flow rotary drier. This reduces the thermal energy consumption compared to hot briquetting, with the greenhouse gases emissions (GHG) dropping in the same proportion.

Besides the energy savings and reduction on GHG emissions, the low temperature briquetting process is a relevant environmentally friendly solution for proper destination of mining fines and steel residues generated in the blast furnace and melt shop operation, or metallurgy processes in general;

While the above description contains many specificities, these should not be construed as limitations on the scope of any embodiment, but as exemplifications of the presently preferred embodiments thereof. Many other ramifications and variations are possible within the teachings of the various embodiments. For example, a comminution operation can be performed before briquetting to ensure adequate particle size (under 6.3 mm), followed by the other operations as described in the embodiments. Another example is the drying of green briquetting using the solar oven technology prior to or during transportation of the briquettes or in a specific device for drying. Even the fines agglomeration process itself, the briquetting, may be broadened to encompass less common agglomeration routes such as extrusion that also may be benefited by the embodiments described herein.

Thus the scope of the invention should be determined by the appended claims and their legal equivalents, and not by the examples given.

The invention claimed is:

1. A binder composition for briquetting iron ore fines, the composition comprising: starch in a range of 0.5% w/w to 3.0% w/w; sodium hydroxide in a range of 0.05% w/w to 1.0% w/w; sodium silicate in a range of 0.05% w/w to 3.5% w/w, graphene from 0.001% to 0.5% w/w, and the balance being metal bearing fines including iron ore fines.

2. The composition of claim 1 wherein the metal bearing fines comprise iron, manganese, bauxite, boron, chromium, iron-nickel and/or ferrous slags.

3. The composition of claim 1 comprising graphene in a range of 0.001% w/w to 0.03% w/w.

4. The composition of claim 1 wherein the metal bearing fines have a particle size up to 6.3 mm.

5. Green briquettes made from the composition of claim 1 wherein said green briquettes are dried using forced flow of air at 150° C. or less.

6. Green briquettes made from the composition of claim 1 wherein said green briquettes are dried by natural convection at 150° C. or less.

7. Green briquettes made from the composition of claim 1 wherein said green briquettes are dried at temperatures between 100° C. and 200° C.

8. A method for briquetting metal bearing fines, comprising combining starch in a range of 0.5% w/w to 3.0% w/w; a base in a range of 0.05% w/w to 1.0% w/w (sodium hydroxide or equivalent); sodium silicate in a range of 0.05% w/w to 3.5% w/w, and 0.01% to 0.5% w/w graphene and metal bearing fines to produce a mixture.

9. The method of claim 8 comprising forming green briquettes from the mixture.

10. The method of claim 8 comprising adding graphene to the mixture, the graphene in a range of 0.001% w/w to 0.5% w/w.

11. The method of claim 8 wherein the metal bearing fines have a particle size up to 6.3 mm.

12. The method of claim 8 comprising drying the green briquettes using forced flow of air at temperatures below 500° C., below 350° C., below 250° C. or below 200° C.

13. The method of claim 9 comprising drying the green briquettes by natural convection at ambient temperatures.

14. The method of claim 9 comprising drying the green briquettes at temperatures between 100° C. and 200° C.

* * * * *